E. T. EVISON.
WATERING TROUGH FOR LIVE STOCK.
APPLICATION FILED SEPT. 4, 1919.
1,329,516.
Patented Feb. 3, 1920.
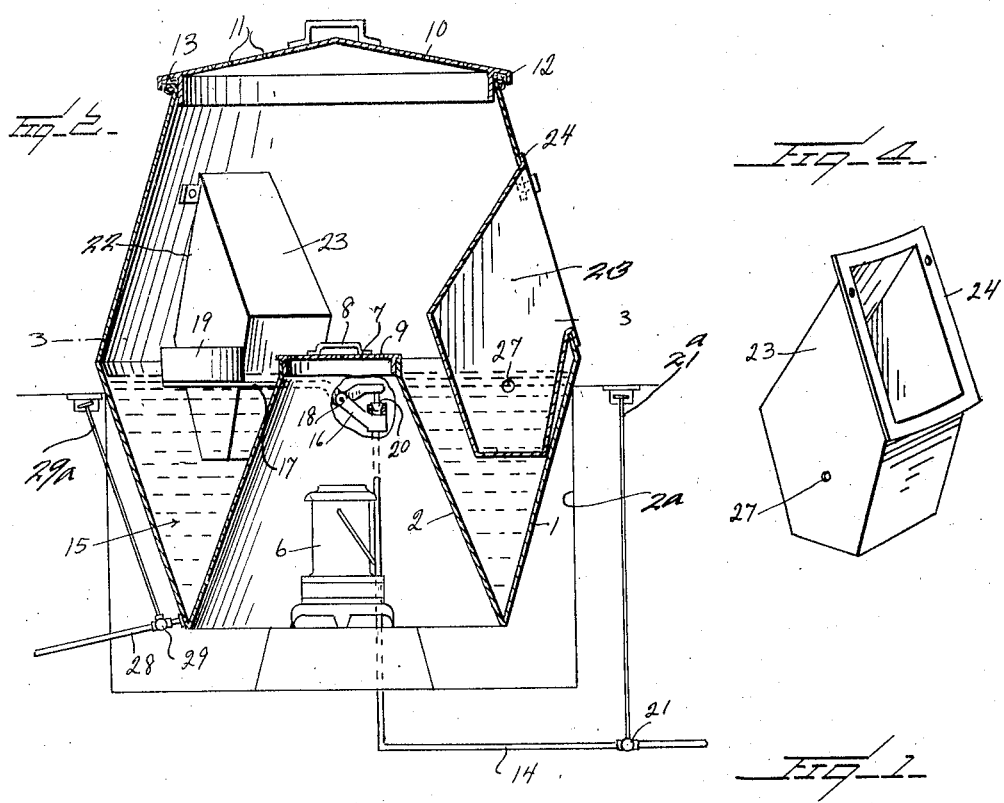
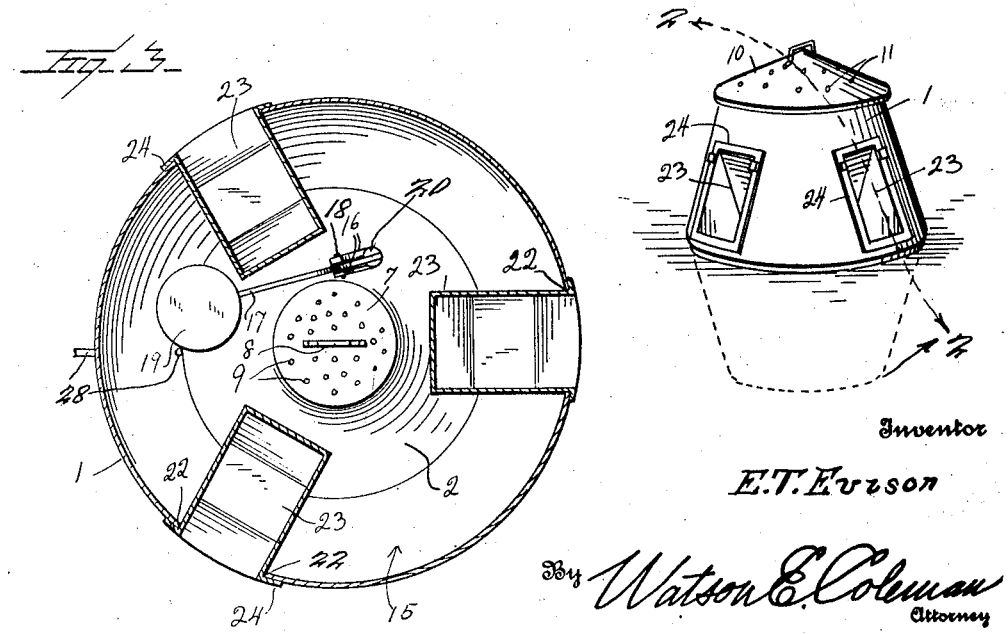
Inventor
E. T. Evison
By Watson E. Coleman
Attorney

UNITED STATES PATENT OFFICE.

EZRA T. EVISON, OF NEW VIRGINIA, IOWA.

WATERING-TROUGH FOR LIVE STOCK.

1,329,516. Specification of Letters Patent. Patented Feb. 3, 1920.

Application filed September 4, 1919. Serial No. 321,624.

*To all whom it may concern:*

Be it known that I, EZRA T. EVISON, a citizen of the United States, residing at New Virginia, in the county of Warren and State of Iowa, have invented certain new and useful Improvements in Watering-Troughs for Live Stock, of which the following is a specification, reference being had to the accompanying drawings.

This invention relates to an improved watering trough for live stock, particularly adapted for use in the winter, hence an object of the invention is to provide a watering trough having means to receive a heater, in order to heat the water, so that live stock may be watered in the winter time.

It has been found that in cold climates the water in the watering troughs freezes, hence requiring the ice to be broken before the live stock can be watered, hence the invention aims to provide a heated watering trough, to prevent the water from freezing in the winter.

A further object of the invention is to provide a watering trough having a heating chamber extending upwardly therein, the upper portion having a perforated cap to permit of the escape of the excessive products of combustion from the heater, and adapted to heat the surrounding water in the trough.

The invention further aims to provide automatically controlled means for supplying water to the trough, and also to provide means, such as a drain cock, to draw off the sediment in the bottom of the trough, and also for emptying the trough when the supply is cut off, so that the trough may be easily and thoroughly cleaned.

A further object of the invention is to provide a watering trough having a plurality of radial water receiving pockets, the walls of which are provided with openings, to permit the water in the trough to flow into the pockets, the pockets being carried by the wall of the trough, so that the live stock may easily drink of the water in the pockets.

A further object of the invention is the provision of watering pockets carried by the wall of the trough extending inwardly from the wall, said pockets being detachably mounted, so that the pockets may be easily removed for repairs.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a perspective view of the improved watering trough constructed in accordance with the invention.

Fig. 2 is a vertical sectional view on line 2—2 of Fig. 1.

Fig. 3 is a horizontal sectional view on line 3—3 of Fig. 2.

Fig. 4 is an enlarged detail view of one of the watering pockets removed from the wall of the trough.

Referring more especially to the drawings, 1 designates the casing of the watering trough, which is preferably conical shaped at both ends, though not necessarily, for it is obvious that the casing may be otherwise shaped.

Rising upwardly from the lower end of the trough, and extending thereinto is a conical member 2, and when this trough is disposed upon a base (possibly of concrete, though not necessarily, for it is obvious that any other base will answer the purpose) a conical heat chamber is formed. A suitable lamp of any kind, such as indicated at 6 is arranged on the base in said chamber, whereby the walls of the chamber may be heated. The upper end of the wall of the heat chamber receives a flanged cap 7, which is provided with a handle 8, whereby the cap may be removed. The cap is perforated as shown at 9, to permit the escape of the excessive products of combustion from the lamp or other heater. A flanged cover or top 10 is provided for the watering trough. This cover or top also has perforations 11, to permit the escape of the products of combustion of the atmosphere. Furthermore, the apertures or perforations of the top or cover of the trough also permit a supply of fresh air to enter the trough and then into the heat chamber for the heater. The cover, or lid of the trough is provided with a radial flange 12, which is grooved as shown at 13 for the reception of felt or other soft material, so that the flange of the cover or top may fit tight in connection with the trough.

The supply pipe 14 for water from any suitable source enters the conical wall of the heat chamber, and terminates at a suitable location in the water receiving chamber 15 of the trough. The upper end of this supply pipe is provided with a pair of arms 16, between which a lever 17 is pivotally mounted, as shown at 18. The long arm of the lever is provided with a float 19, and the short arm has a valve 20, which coöperates with the upper end of the supply pipe to close the same, according to the level of the water. The supply pipe exterior of the watering trough or tank has a hand operated valve 21 for the purpose of cutting off the supply of water.

The wall of the tank or trough near the upper portion is provided with a plurality of elongated rectangular openings 22, and 23 denotes a plurality of water receiving pockets, which are preferably of the shape shown, though not necessarily, and are fitted into the openings 22. These pockets are provided with marginal flanges 24, which overlie the surface of the wall of the trough, to limit the pockets in their positions. Suitable headed bolts or screws pass through the flanges of the pockets, in order to detachably fasten the pockets in position. The pockets extend inwardly and downwardly, and one wall of each pocket has a perforation 27, which is so positioned relatively to the supply end of the supply pipe, as to permit the water to enter the pocket, whereby the live stock can insert their heads into the pockets and drink the water that flows therein. The heat from the heat chamber radiates through the wall, and heats the water in the trough and prevents the small amount of water that is contained in the pockets from freezing in cold weather. By means of the float controlled valve, which is operated according to the level of the water in the trough, the water in the trough is prevented from overflowing.

The lower part of the wall of the trough is provided with a drain tube or pipe 28, which has a drain cock 29, and when this drain cock is open, the sediment which may collect in the bottom of the tank or trough may be easily drawn off.

The watering trough is mounted in a pit 2ª which is formed in the ground, whereby the water receiving pockets are disposed adjacent the upper surface of the ground. The valve 21 of the supply pipe 14 is controlled by a hand operated valve rod 21ª, which passes upwardly through the ground near the pit, so as to be manually manipulated. The valve 29 of the drain pipe 28 is also controlled by a rod 29ª, which also passes partially through the ground and is adapted to be manually manipulated, for opening and closing the valve 29, to drain off the sediment.

The invention having been set forth, what is claimed as new and useful is:

1. In a watering trough for live stock, the combination with a casing having a conical heat chamber extending upwardly therein and provided with a perforated cover, of a heating element for the chamber, a water supply pipe for the trough, and means operated by the level of the water, for closing the end of the supply pipe which enters the trough, said trough having a plurality of radial water receiving compartments communicatively connected with the watering trough.

2. In a watering trough for live stock, the combination with a casing having a water chamber, and provided with a plurality of water receiving pockets carried by the wall of the chamber and extending into said chamber, of a heating chamber rising upwardly into the water chamber, a heating medium therefor, a perforated cover for the heat chamber, and a perforated top for the water trough.

3. In a watering trough for live stock, the combination with a casing having a water chamber, of a heat chamber extending upwardly into said water chamber, means for supplying water to the water chamber, water receiving pockets carried by the wall of the casing and extending into the water chamber, to receive the heated water, and means actuated by the water according to its level, for cutting off the supply to the water chamber automatically, and perforated closures respectively for the upper end of the casing and the heat chamber.

4. In a watering trough for live stock, the combination with a casing having a water chamber, means to supply water thereinto, of a heat chamber rising upwardly into the water chamber and provided with a perforated upper part, the wall of the casing having a plurality of openings, and a plurality of water receiving pockets detachably extending through the openings and extending down and into the water chamber in conformity with the heat chamber.

5. In a watering trough for live stock, the combination with a casing having a water chamber, means to supply water thereinto, of a heat chamber rising upwardly into the water chamber and provided with a perforated upper part, the wall of the casing having a plurality of openings, and a plurality of water receiving pockets detachably extending through the openings and extending down and into the water chamber, in conformity with the heat chamber, said pockets having marginal flanges, and means passing through the flanges and threaded into the wall of the casing for detachably connecting the pockets in place and means carried by the upper end of the supply pipe and actuated by the water according to its level, for automatically controlling the supply of water into the water chamber, the walls of the pockets having openings to permit water from the water chamber to enter the pockets, a cover for the casing and a draining means for the water chamber.

In testimony whereof I hereunto affix my signature.

EZRA T. EVISON.